United States Patent
Pike et al.

(10) Patent No.: US 12,215,729 B2
(45) Date of Patent: Feb. 4, 2025

(54) SMART OPERATING NUT

(71) Applicant: Mueller International, LLC, Atlanta, GA (US)

(72) Inventors: Andrew Henderson Pike, Ooltewah, TN (US); Amanda Leverett Owens, Trenton, GA (US); Matthew Thomas Sutterfield, Signal Mountain, TN (US)

(73) Assignee: Mueller International, LLC, Atlanta, GA (US)

( * ) Notice: Subject to any disclaimer, the term of this patent is extended or adjusted under 35 U.S.C. 154(b) by 526 days.

(21) Appl. No.: 17/545,670

(22) Filed: Dec. 8, 2021

(65) Prior Publication Data

US 2023/0175537 A1  Jun. 8, 2023

(51) Int. Cl.
F16B 1/00 (2006.01)
B25B 27/24 (2006.01)
F16B 37/08 (2006.01)

(52) U.S. Cl.
CPC .......... *F16B 37/0878* (2013.01); *B25B 27/24* (2013.01); *F16B 2200/95* (2023.08)

(58) Field of Classification Search
None
See application file for complete search history.

(56) References Cited

U.S. PATENT DOCUMENTS

| | | | |
|---|---|---|---|
| 2,796,079 | A | 6/1957 | Hugg |
| 7,278,341 | B1 | 10/2007 | Novin et al. |
| 7,412,898 | B1 | 8/2008 | Smith et al. |
| 8,657,021 | B1 * | 2/2014 | Preta ................ H04Q 9/00 169/61 |
| 9,458,609 | B2 * | 10/2016 | Fleury, Jr. ............ E03B 9/16 |
| 9,483,674 | B1 * | 11/2016 | Fink ................ G06K 7/10366 |
| 10,934,693 | B2 * | 3/2021 | Sitnikov ............ G01L 19/0007 |
| 11,080,584 | B2 * | 8/2021 | Grove ............ G06K 19/07758 |
| 2005/0045000 | A1 | 3/2005 | Sessa |
| 2008/0056834 | A1 | 3/2008 | Mcauliffe |

(Continued)

FOREIGN PATENT DOCUMENTS

| | | |
|---|---|---|
| WO | 2021022311 | 2/2021 |
| WO | 2023107301 | 6/2023 |

OTHER PUBLICATIONS

Amazon; Article entitled: "20741A Digital Torque Adapter ⅜" Drive", available at <https://www.amazon.com/Neiko-20742A-Digital-14-7-99-6-Foot-Pound/dp/B009GLISIO?th=1>, accessed on Nov. 23, 2021, 12 pgs.

(Continued)

*Primary Examiner* — K. Wong
(74) *Attorney, Agent, or Firm* — Taylor English Duma LLP (57) ABSTRACT

An operating nut can include a body and a digital identification tag secured to the body, at least one of the body and the digital identification tag defining an outer surface of the operating nut. The body can define a central bore defining an axis and can include a working portion defining an end surface and a plurality of side surfaces defining a polygonal shape in a cross-sectional plane orthogonal to the axis; and a flange portion extending outward from the working portion in a radial direction with respect to an axis of the operating nut, the flange portion defining a first end surface and a second end surface, the central bore extending through each of the working portion and the flange portion.

20 Claims, 9 Drawing Sheets

(56) References Cited

U.S. PATENT DOCUMENTS

| | | |
|---|---|---|
| 2013/0047799 A1 | 2/2013 | Gareis |
| 2014/0260652 A1* | 9/2014 | Hsieh .................. G01L 5/24 73/761 |
| 2018/0223891 A1* | 8/2018 | White .................. G01K 1/024 |
| 2019/0072932 A1 | 3/2019 | Sitnikov et al. |
| 2019/0101463 A1 | 4/2019 | Fly et al. |

OTHER PUBLICATIONS

Bryce Security Fastener; Article entitled: "Tamper Proof, Anti Theft Security Screws, Bolts, Nuts, Fasteners", available at <https://www.brycefastener.com>, accessed on Mar. 24, 2021, 10 pgs.

Facom; Article entitled: "New Smart Torque Wrench—A Smarter Way to Torque", located at <https://www.facom.com/produits/Smart-Torque-Description.html>, accessed on Mar. 15, 2021, 3 pgs.

Infochip; Article entitled: "DuraPlug6", located at <https://infochip.azurewebsites.net/products/rfid-tags/hf/duraplug6>, accessed on Mar. 24, 2021, 1 pg.

Infochip; Article entitled: "Valves/Actuators", located at <https://www.infochip.com/industries/valves-actuators/>, accessed on Mar. 24, 2021, 2 pgs.

Infochip; Data Sheet for DuraPlug6 PPA, publicly available prior to Dec. 8, 2021, 1 pg.

Mueller; Document entitled: "Gate Valve Troubleshooting", publicly available prior to Dec. 8, 2020, 3 pgs.

RFID, Inc.; Article entitled: "UHF 915 MHZ Bolt & Screw RFID Tags", located at <https://www.rfidinc.com/uhf-915-mhz-bolt-screw-rfid-tags>, accessed on Jun. 22, 2021, 6 pgs.

RFID, Inc.; Data Sheet for Model S4 UHF Reader, published Jul. 2019, 32 pgs.

Secure ID News; Article entitled: "Understanding the different memory types used in contactless smart cards and RFID tokens", located at <https://www.secureidnews.com/news-item/understanding-the-different-memory-types-used-in-contactless-smart-cards-and-rfid-tokens/>, accessed on Nov. 9, 2021, 9 pgs.

SkyRFID LLC; Article entitled: "RFID Range Overview", located at <https://skyrfid.com/RFID_Range.php>, accessed on Nov. 9, 2021, 5 pgs.

Tigersupplies; Article entitled: "Trumbull 367-5016 T-Handle Main Valve Key", publicly available prior to Dec. 8, 2021, 2 pgs.

Valve Magazine; Article entitled: "The Case for RFID in Process Plants", published Jun. 5, 2019, 6 pgs.

Valve User Magazine; Article entitled: "RFID Chips on Valves and Actuators?", located at <https://www.valveuser.com/2253-rfid-chips-on-valves-and-actuators.htm>, accessed on Mar. 15, 2021, 7 pgs.

Wikipedia; Article entitled: "Radio-frequency identification", available at <https://en.wikipedia.org/wiki/Radio-frequency_identification>, accessed on Oct. 21, 2021, 30 pgs.

Pike, Andrew Henderson; International Search Report and Written Opinion for PCT Application No. PCT/US22/51312, filed Nov. 30, 2022, mailed Jun. 21, 2023, 12 pgs.

Pike, Andrew Henderson; International Preliminary Report on Patentability for PCT Application No. PCT/US22/51312, filed Nov. 30, 2022, mailed Jun. 20, 2024, 9 pgs.

\* cited by examiner

SMART OPERATING NUT

TECHNICAL FIELD

Field of Use

This disclosure relates to operating nuts for devices such as valves in a fluid distribution system. More specifically, this disclosure relates to "smart" operating nuts and wrenches incorporating radio-frequency identification (RFID) technology.

Related Art

Identifying and tracking devices such as hydrants and valves—even with serial numbers but especially without—in a fluid distribution system can be difficult. The design of the devices and the harsh conditions in which they continuously operate are not conducive to on-site or on-device identification of the devices, much less tracking and documentation of their use. The devices are often formed in a casting process that makes even legible serialization difficult or impossible, and during use such mechanically formed identification methods or any separately affixed labels can wear or become obscured. Some devices can even be buried in deep pits and are not accessible for direct physical inspection. Furthermore, some devices do not carry unique information about their identity, much less identifying information that is easily and reliably stored for immediate access.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is an operating nut comprising: a body defining a central bore defining an axis and comprising: a working portion defining an end surface and a plurality of side surfaces defining a polygonal shape in a cross-sectional plane orthogonal to the axis; and a flange portion extending outward from the working portion in a radial direction with respect to an axis of the operating nut, the flange portion defining a first end surface and a second end surface, the central bore extending through each of the working portion and the flange portion; and a digital identification tag secured to the body, at least one of the body and the digital identification tag defining an outer surface of the operating nut.

In a further aspect, disclosed is a tool for manipulating an operating nut of a valve, the tool comprising: a tool end defining a tool socket defining an axis, the socket defining a plurality of side surfaces and sized to receive the operating nut, the operating nut defining a substantially polygonal shape in a cross-sectional plane orthogonal to the axis; a handle end extending from the tool end; and a radio-frequency identification (RFID) reader secured to the tool.

In yet another aspect, disclosed is a method of using an operating nut, the method comprising: engaging a tool with the operating nut of a device, the operating nut comprising a digital identification tag and the tool comprising a digital identification tag reader, the operating nut further comprising a body defining a central bore defining an axis, an end surface, and a plurality of side surfaces defining a polygonal shape in a cross-sectional plane orthogonal to the axis, the central bore extending through the body; rotating the tool to rotate the operating nut; and activating the identification tag of the operating nut with the identification tag reader of the tool.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

To simplify the description of various elements disclosed herein, the conventions of "left," "right," "front," "rear," "top," "bottom," "upper," "lower," "inside," "outside," "inboard," "outboard," "horizontal," and/or "vertical" may be referenced. Unless stated otherwise, "front" describes that end of the valve nearest to and occupied by a pipe received by the valve; "rear" is that end of the valve that is opposite or distal the front; "left" is that which is to the left of or facing left from a person facing towards the front; and "right" is that which is to the right of or facing right from that same person while facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

In one aspect, an operating nut and associated methods, systems, devices, and various apparatuses are disclosed herein. In one aspect, the operating nut can comprise an identification tag or, more specifically, a radio-frequency identification (RFID) tag.

As suggested above, the design of devices such as valves in a fluid distribution system and the harsh conditions in which such devices continuously operate over long periods of time are not conducive to on-site or on-device identification and documentation. Currently available devices often do not have individualized serial numbers. An operating nut for a device that comprises a digital identification tag could facilitate order management, field service and operation, and asset tracking. More specifically, such an operating nut could facilitate initialization, and confirmation, transmission, and/or display of a serial number, a digital certificate of authenticity, and/or other data related to the device. Users of such a system would require little training because the data would be automatically available upon scanning the valve for a chip. The combination of a "smart" operating nut and a "smart" tool, e.g., a wrench for manipulating the operating nut, could also serve as a training tool for new service technicians handling the devices.

Figure 1:
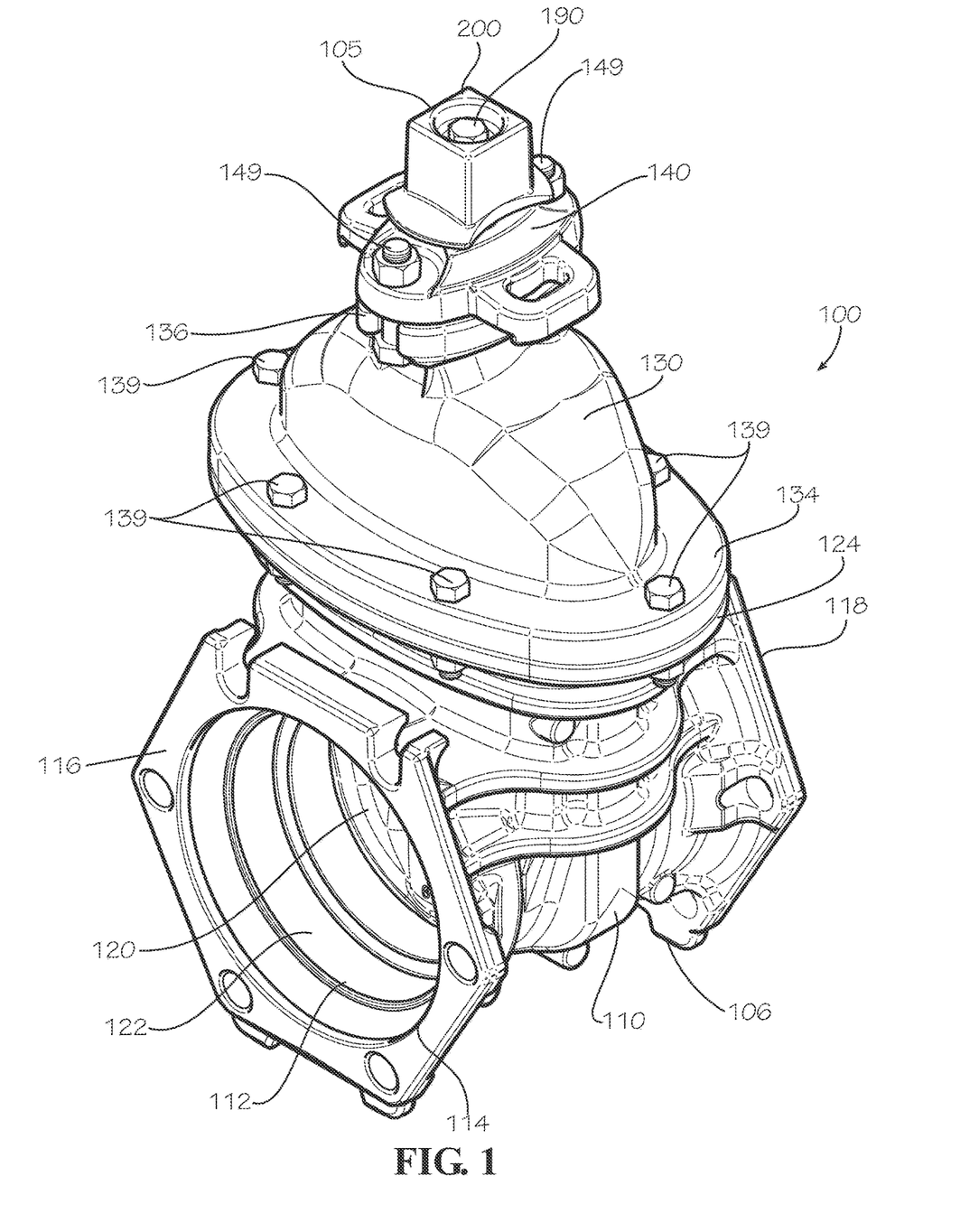
FIG. 1 is a top perspective view of a valve comprising an operating nut in accordance with one aspect of the current disclosure.

FIG. 1 is a top perspective view of a device 100 in accordance with one aspect of the current disclosure. The device 100 can be or can comprise a valve or another device, as disclosed below. The device 100 can define a first end or top end 105 and a second end or bottom end 106. The device 100 can comprise an operating nut 200, which can be positioned and secured to the device 100 proximate to the top end 105 and can define the top end 105. In some aspects, including those in which the device 100 is a gate valve, the device 100 can comprise a body 110, a bonnet 130, a stem 710 (shown in FIG. 7), and a valve member 120, which can be a gate such as in the gate valve shown. The body 110 can comprise an interior cavity 112 which can be substantially continuous through or can extend through the body 110 from an inlet 114 at a first end 116 to an outlet (not shown) at a second end 118. The body 110 can define the interior cavity 112 and a fluid bore 122. The interior cavity 112 and fluid bore 122 can allow fluid flow through the body 102 such that, in operation, fluid flows through the inlet 114, through the interior cavity 112 and fluid bore 122, and through the outlet. The body 110 can comprise a body flange 124, to which the bonnet 130 can be secured.

As shown, the valve member 120 can be housed within the body 110. The stem 710 can also be housed within the body 110 or at least partly so, and the stem 710 can be connected to the valve member 120 such that movement of the stem 710 moves the valve member 120 to permit or restrict fluid flow through the interior cavity 112 and the fluid bore 122 defined in the body 110. When the valve member 120 is in an open position, fluid can be allowed to flow through the interior cavity 112 of the body 110. When the valve member 120 is in a closed position, the valve member 120 can disrupt or prevent fluid flow through the interior cavity 112 of the body 110. The device 100 can be any device for metering or regulating the flow of a fluid in a fluid distribution system including, for example and without limitation, a gate valve (as shown), a ball valve, a butterfly valve, a disc valve, a plug valve, or any other desired valve type, including any valve with a rotatable stem, which can be described as a stem valve; various types of hydrants; and any device with an operating nut or a fastener such as the operating nut 200 for operating the valve member 120.

The bonnet 130 can be mounted on or to the body 110. The bonnet 130 can define a bonnet interior cavity and can comprise a bottom flange 134. Each of the bottom flange 134 and the body flange 124 can define flange bores. Fasteners 139 comprising fastener elements such as, for example and without limitation, bolts and nuts, can extend through the flange bores to secure the bonnet 130 to the body 110. The device 100 can comprise a seal such as, for example and without limitation, an O-ring (not shown) or another type of seals, to seal a connection between the bonnet 130 and the body 110. In some aspects, as shown, the operating nut 200 can protrude from and define an outermost portion of the device 100 at the top end 105. In some aspects, the operating nut 200 can extend from and can be directly adjacent to the body 110 or the bonnet 130. In other aspects, another portion of the device such as, for example and without limitation, a stuffing box 140 of the device 100 can be positioned between the operating nut 200 and the body 110 or the bonnet 130. In some aspects, such a portion of the valve (e.g., the stuffing box 140) can be secured to a top flange 136 of the bonnet 130 with fasteners 149. The operating nut can be secured to a remaining portion of the device 100 with a fastener 190, which can be a retaining fastener.

Figure 2:
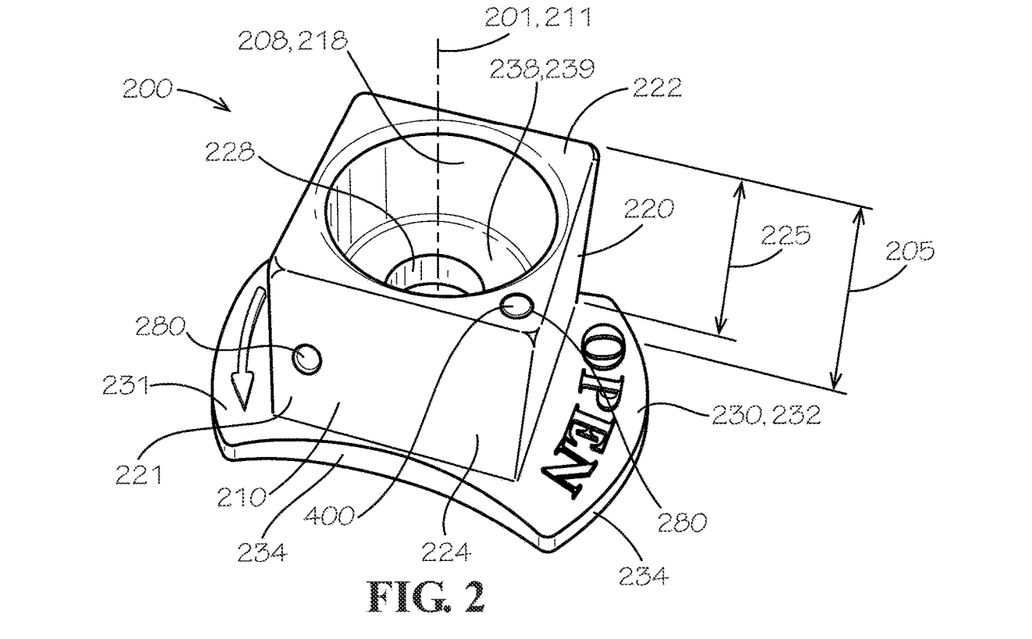
FIG. 2 is a top perspective view of the operating nut of FIG. 1, which is shown with a radio-frequency identification (RFID) tag embedded in a top end surface.

FIG. 2 is a top perspective view of the operating nut 200 of FIG. 1, which can comprise an identification tag 400. In some aspects, the identification tag 400 can be positioned elsewhere on the device 100 such as, for example and without limitation, on the body 110, the bonnet 130, the stuffing box 140, or the fastener 190. The identification tag 400 can be a digital identification tag and, more specifically, a radio-frequency identification (RFID) tag. In some aspects, the identification tag 400 can utilize NFC (near-field communications) technology. In some aspects, operation of the identification tag 400 need not require any electrical or other power on the device 100. By storing or embedding information digitally on the device, the operating nut 200 can be a "smart" operating nut and the device 100 itself can be a "smart" device. By being "smart," the operating nut 200 or, more generally, the device 100 is configured to connect to a network for purposes of sending information to and/or receiving information from the network and/or otherwise interacting with the network. The operating nut 200 can comprise a body 210 defining a central bore 208, which can define a bore axis or axis 211. More generally, the operating nut 200 can define a nut axis 201, which can be aligned with the axis 211. Either or both of the axes 201,211 can be central axes of the components in which they are defined. The operating nut 200 can define a working end or working portion 220 and a flange or flange portion 230. The working portion 220 can define a height 225, and the body 210 of the operating nut 200 can define an overall height 205.

The working portion 220 of the body 210 can define an outer surface 221 comprising one or more various surfaces, which can interact with a surface of a mating tool 600 (shown in FIG. 6) such as, for example and without limitation, a wrench. The working portion 220 can define, for example and without limitation, an end surface 222 and one or more side surfaces 224, each of which can be angled with respect to—or even orthogonal to, or at least substantially orthogonal to—the end surface 222. In some aspects, the one or more side surfaces 224 can define a polygonal shape in a cross-sectional plane orthogonal to the axis 211. The polygonal shape can be, for example and without limitation, a hexagon, a pentagon, or a rectangle (e.g., a square, as shown) defining six, five, and four sides, respectively. In some aspects, the one or more side surfaces 224 can define a non-polygonal shape in a cross-sectional plane orthogonal to the axis 211. The non-polygonal shape can define one or more curvilinear sides, which can be continuous. More specifically, tangent lines of adjoining sides of the shape can be collinear.

Surfaces that are otherwise orthogonal to each other or in another relationship with each other might, by some technical definitions, not be orthogonal or the other relationship due to the presence of a draft angle or other slight angle on the part, due to one or both surfaces not being perfectly flat or smooth, or due to other modification(s). When surfaces are described herein as being "substantially" orthogonal or in some other relationship, it is intended and contemplated that such instances be covered by the definition. To the degree that some deviation from the technical definition of such a relationship is so minor as to be hardly perceptible, it is intended and contemplated that such a shape be incorporated into the definition of the shape, with or without use of the conditional term "substantially" as a qualifier.

The flange portion 230 of the body 210 can extend outward from the working portion 220 in a radial direction with respect to the axis 211 of the operating nut 200. The flange portion 230 can define an outer surface 231 comprising one or more various surfaces, which can interact with a surface of the tool 600 and/or a portion of the working portion 220. The flange portion 230 can define, for example and without limitation, a top end or first end surface 232 and a bottom end or second end surface 236 (shown in FIG. 3), each of which can be angled with respect to—or even orthogonal to, or at least substantially orthogonal to—the one or more side surfaces 224 of the working portion 220. The flange portion 230 can define one or more side surfaces 234, each of which can be angled with respect to—or even orthogonal to, or at least substantially orthogonal to—one or both of the end surface 232 and the second end surface 236. As shown, the flange portion 230 need not extend outward from the working portion 220 by the same distance in each direction. In at least one or more directions, the flange portion 230 need not extend outward from the working portion 220 at all.

Figure 3:
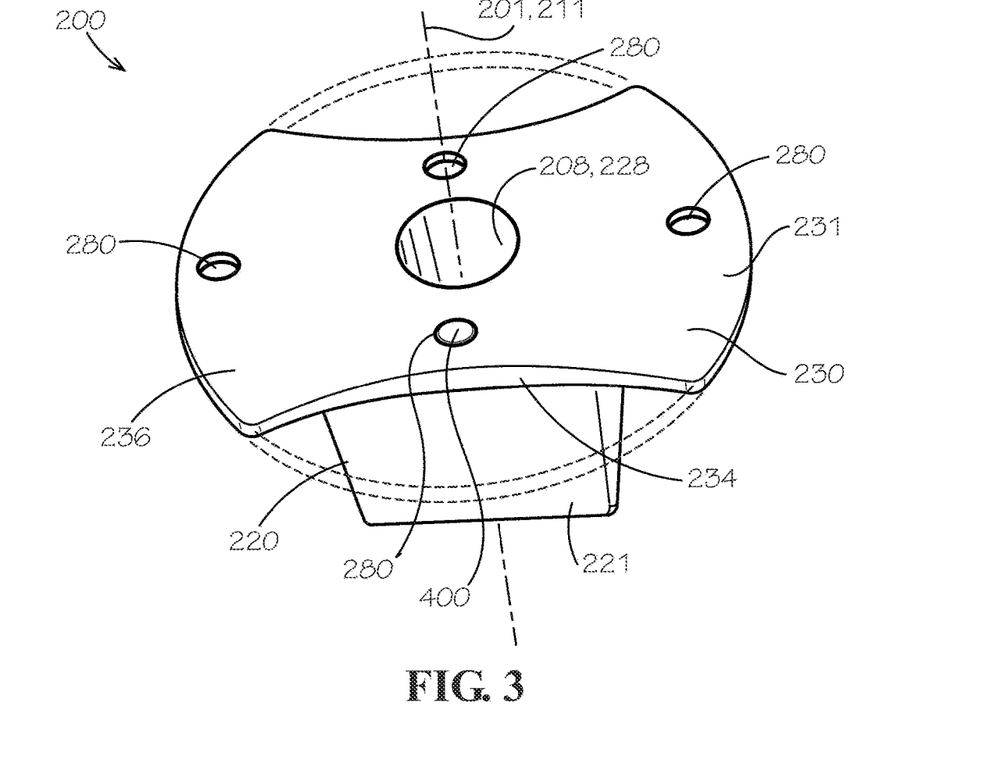
FIG. 3 is a bottom perspective view of the operating nut of FIG. 1, which is shown with the RFID tag of FIG. 2 embedded in a second end surface in accordance with another aspect of the current disclosure.

In some aspects, the one or more side surfaces 234 of the flange portion 230 can define a polygonal shape in a cross-sectional plane orthogonal to the axis 211. The polygonal shape can be, for example and without limitation, a hexagon, a pentagon, or a rectangle (e.g., a square, as shown) defining six, five, and four sides, respectively. In some aspects, the one or more side surfaces 224 can define a non-polygonal shape in a cross-sectional plane orthogonal to the axis 211. The non-polygonal shape can be, for example and without limitation, a circle or an oval, with or without linear or curvilinear truncation, the example of which is shown in FIG. 3. The non-polygonal shape can define one or more curvilinear sides, which can be continuous. More specifically, tangent lines of adjoining sides of the shape can be collinear.

The central bore 208 can extend through one or both of the working portion 220 and the flange portion 230. The central bore 208 can define a first portion 218 and a second portion 228. The first portion 218 of the central bore 208 can extend through the working portion 220, and the second portion 228 of the central bore 208 can extend through the flange portion 230. In some aspects, a third portion 238 can define an intersection between the first portion 218 and the second portion 228. The third portion 238 can comprise or define a shoulder surface 239. In some aspects, as shown in exemplary aspects in FIG. 8, the third portion 238 and, more specifically, the shoulder surface 239 can be offset in an axial direction along the axis 211 with respect to an intersection of the working portion 220 and the flange portion 230. A diameter of the second portion 228 can be less than a diameter of the first portion 218, which can facilitate retention of the operating nut 200 on or by the device 100 by the fastener 190 (shown in FIG. 1).

The identification tag 400 can be secured to the body 210. In some aspects, the identification tag 400 can be secured with an adhesive. In some aspects, the identification tag 400 can be secured with a friction fit within a portion of the body 210. In some aspects, the identification tag 400 can be received within a cavity or recess 280, which can be defined in one or more of the surfaces of the operating nut 200. In some aspects, as shown, the cavity 280 can be defined in the end surface 222 and, more specifically, in a portion of the working portion 220 sized and otherwise configured to receive the identification tag 400. In some aspects, any one or more cavities 280 can be defined in the end surface 236 and, more specifically, in a portion of the flange portion 230 sized and otherwise configured to receive the identification tag 400. The identification tag 400 can be embedded in any of the aforementioned surfaces and/or cavities such as, for example and without limitation, the cavity 280 defined in the top end surface 222.

The identification tag 400 can define at least a portion of at least one of the outer surfaces 221,231 of the operating nut 200. More specfiically, the portion of the outer surface of the operating nut defined by the identification tag 400 can be coincident or coplanar with the end surface 222 of the working portion 220 of the body 210. In some aspects, the identification tag 400 need not protrude outwardly past the outer surfaces 221,231 in which it can be embedded in any direction away from or along one or both of the axes 201,211.

FIG. 3 is a bottom perspective view of the operating nut 200 of FIG. 1, which is shown with the identification tag 400 of FIG. 2 embedded in the second end surface 236 of the flange portion 230 in accordance with another aspect of the current disclosure. The identification tag 400 can be embedded in any one of the cavities 280 defined in the second end surface 236.

The cavities 280 can be positioned proximate to a radially outer edge of the body 210 of the operating nut 200. For example and without limitation, in some aspects, a distance between a center of any one of the cavities 280 and any one of the identification tags 400 and an edge of the operating nut 200 can be less than or equal to three diameters of the cavity 280 or the identification tag 400 (or three times a width of the cavity 280 or the identification tag 400 in a radial direction). In some aspects, a distance between the center of any one of the cavities 280 and any one of the identification tags 400 and an edge of the operating nut 200 can be less than or equal to two diameters of the cavity 280 or the identification tag 400 (or two times the width of the cavity 280 or the identification tag 400 in a radial direction). In some aspects, a distance between the center of any one of the cavities 280 and any one of the identification tags 400 and an edge of the operating nut 200 can be less than or equal to one diameter of the cavity 280 or the identification tag 400 (or the width of the cavity 280 or the identification tag 400 in a radial direction).

Figure 4:
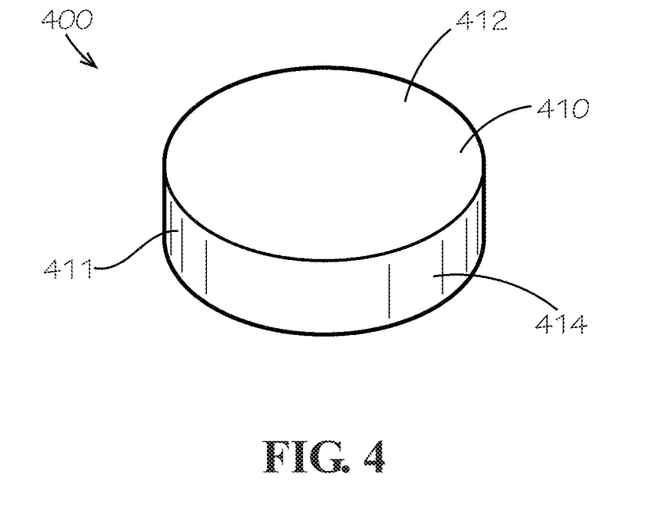
FIG. 4 is a top perspective view of the RFID tag of FIGS. 2 and 3.

FIG. 4 is a top perspective view of the identification tag 400 of FIGS. 2 and 3. For example and without limitation, the identification tag 400 can be the RFID tag product DuraPlug6 available from Info Chip LP. The identification tag 400 can comprise a body 410 defining an outer surface 411, which can comprise a first end surface 412, a second end surface 416 (shown in FIG. 5), and a side surface 414. The side surface 414 can extend between the first end surface 412 and the second end surface 416. In some aspects, as shown, the identification tag 400 can define a cylindrical shape. In some aspects, the identification tag 400 can define any other desired shape including that of a polygon. The identification tag 400 can define an axis 401.

The identification tag 400 can comprise a microchip or integrated circuit for storing and processing radio-frequency or RF signals, an antenna for receiving and transmitting the signals, and a substrate. The data in the identification tag 400 can be stored in a non-volatile memory. The identification tag 400 can include either fixed or programmable logic for processing the data. In some aspects, the identification tag 400 can be passive, in which case the identification tag 400 can use the radio energy transmitted by an identification tag reader 800 (shown in FIG. 8). In some aspects, the identification tag 400 can be active, in which case the identification tag 400 can comprise its own power supply, e.g., an internal or external battery able in some aspects to last several years. As desired, any such power supply, e.g., the battery, can fit inside a cavity or other space positioned behind or proximate to where the identification tag 400 is positioned on the operating nut 200, e.g., the cavity 280. The identification tag 400 can be read-only (e.g., with ROM or read-only memory) or read/write (e.g., EEPROM or electrically erasable programmable read-only memory).

Figure 5:
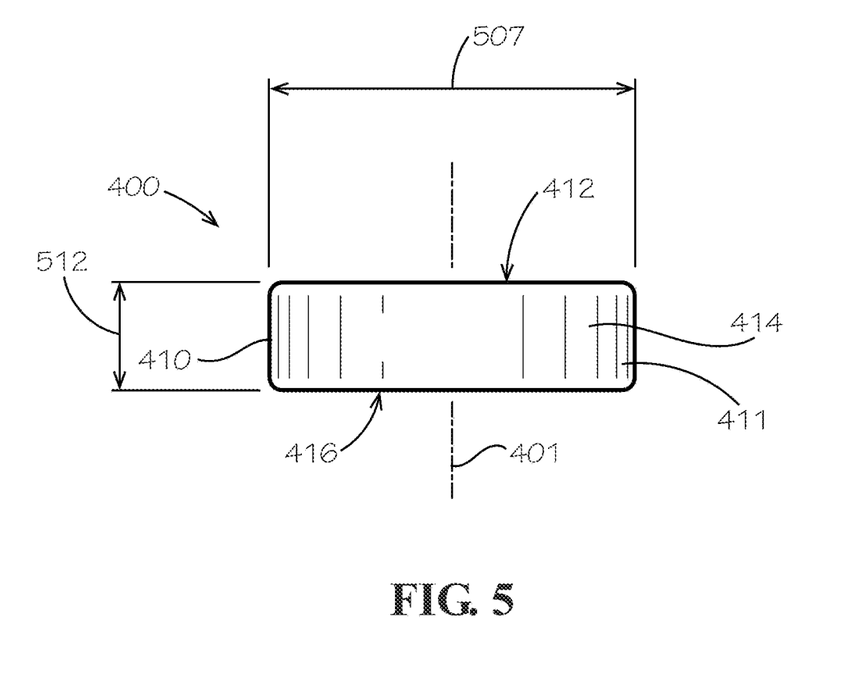
FIG. 5 is a side elevation view of the RFID tag of FIGS. 2 and 3.

FIG. 5 is a side elevation view of the identification tag 400 of FIGS. 2 and 3. As shown, the identification tag 400 can define a diameter 507, which in the case of a non-cylindrical shape can be a width of the identification tag 400. In some aspects, a thickness 512 of the identification tag 400 can be constant or at least substantially constant. For example and without limitation, as represented by the InfoChip DuraPlug6 RFID tag product, the diameter 507 can be 0.236 inches (6 mm) or less, and the thickness can be 0.089 inches (2.25 mm) or less. The body 410 of the identification tag 400 can be formed from any desirable material. For example and without limitation, the identification tag 400, like the RFID tag from InfoChip, can be formed from a polymer such as, for example and without limitation, polyphthalamide (PPA) or polyether ether ketone (PEEK).

In some aspects, a "read" range of the identification tag 400, i.e., a maximum distance from a surface of the identification tag 400 from which the identification tag 400 can be activated and content of the identification tag 400 accessed, can be equal to or less than 0.1 inches. In some aspects, the read range of the identification tag 400 can be equal to or less than 0.25 inches. In some aspects, the read range of the identification tag 400 can be equal to or less than 0.5 inches. In some aspects, the read range of the identification tag 400 can be equal to or less than one inch. In some aspects, the read range of the identification tag 400 can be equal to or less than 2.5 inches. In some aspects, the read range of the identification tag 400 can be equal to or less than 5 inches.

In some aspects, the read range of the identification tag 400 can be equal to or less than 10 inches. In some aspects, the read range of the identification tag 400 can be equal to or less than 12 inches (approximately 0.3 meters). In some aspects, the read range of the identification tag 400 can be equal to or less than 36 inches (approximately one meter). In some aspects, the read range of the identification tag 400 can be equal to or less than 52 feet (approximately 16 meters). In some aspects, the read range of the identification tag 400 can be equal to or less than 325 feet (approximately 100 meters). In some aspects, the read range of the identification tag 400 can be equal to or less than 1.86 miles (approximately 3,000 meters). In some aspects, the read range of the identification tag 400 can be more than 10 inches or in a range between any two of the aforementioned read range endpoints. The read range can vary depending on the frequency of the communication with the identification tag 400 and depending on whether the identification tag 400 is passive (unpowered) or active (powered).

Figure 6:
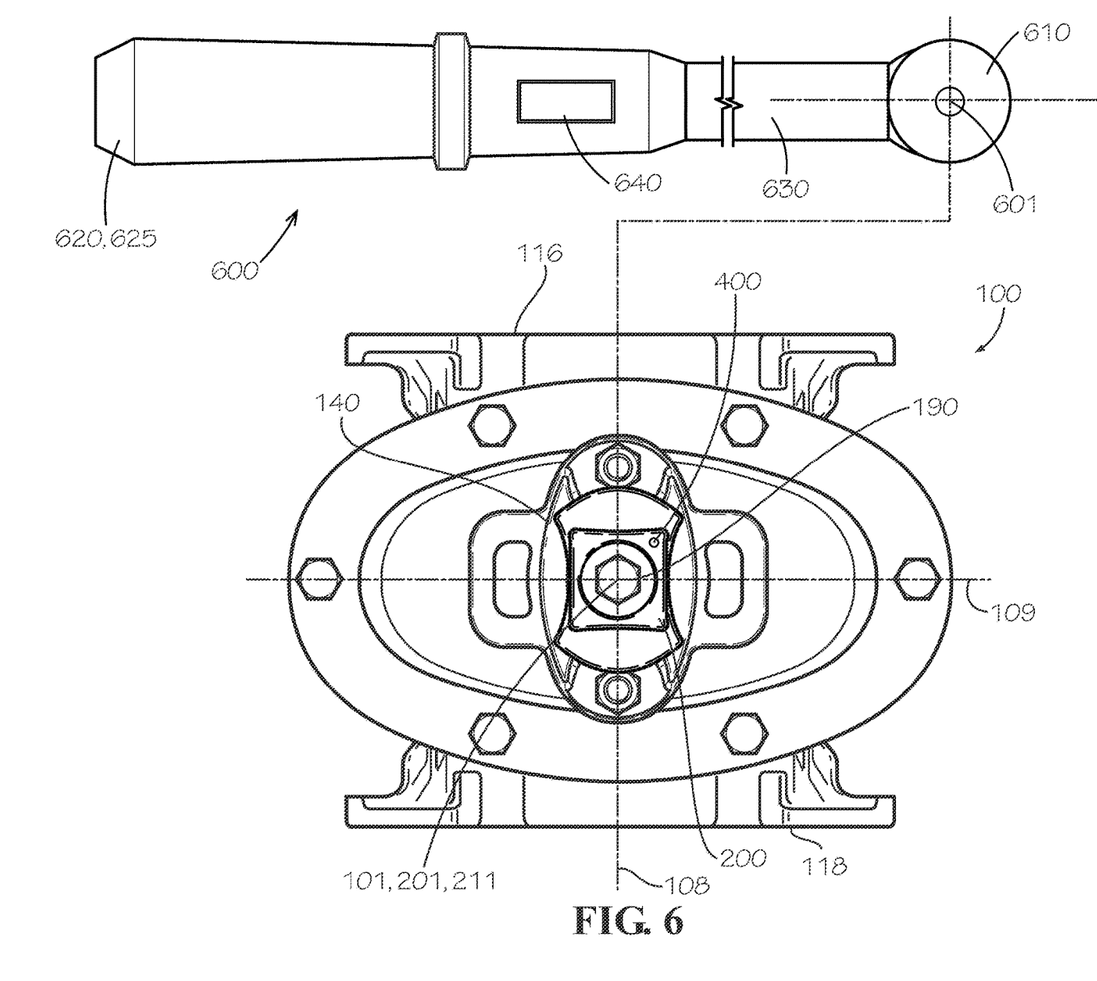
FIG. 6 is an exploded top plan view of the valve of FIG. 1 shown with a tool and, more specifically, a torque wrench mounted to the operating nut of FIG. 1 in accordance with one aspect of the current disclosure.

FIG. 6 is an exploded top plan view of the device 100 of FIG. 1 shown with the tool 600, which can be a wrench such as, for example and without limitation, a torque wrench. The tool 600 can be mounted to the operating nut 200 of FIG. 1 in accordance with one aspect of the current disclosure. The view is exploded in that, for clarity, the tool 600 is shown separated from the operating nut 200. In some aspects, as shown, an intersection between a longitudinal axis 108 and a transverse axis 109 of the device 100 can define an axis 101, which can be a device actuator axis. The tool 600 can be configured to manipulate (e.g., tighten or loosen by rotation about the axis 101) the operating nut 200 of the device 100. More specifically, the tool 600 can be configured to tighten or loosen the operating nut 200 about the axis 101 and can thereby move or adjust a position of the valve member 120 (shown in FIG. 1) between the open position and the closed position. The tool 600 can comprise a tool end 610 and a handle end 620, which can extend from the tool end 610.

The handle end 620 can comprise a handle 625, which can extend radially outward with respect to an actuator axis 601 of the tool 600. The handle 625 by its radially offset position and ergonomics can be configured to apply torque to a portion of the valve such as the operating nut 200. The tool 600 can further comprise a shaft 630, which can extend between the tool end 610 and the handle end 620.

The tool 600 can comprise a controller (not shown) and a display 640 for displaying information about the device 100 through its "reading" of the identification tag 400 positioned on the device 100. The tool 600 can further comprise networking capabilities, which can permit the tool 600 to communicate information to and receive information from a server via a network. The display 640 can display information about the use of the tool 600 and/or the history of the device 100 such as, for example and without limitation, one or more of the data described below. The tool 600 and/or the identification tag 400 can be incorporated in a system such as, for example and without limitation, that shown in U.S. Patent Publication No. 2019/0072932, published Mar. 7, 2019, which is hereby incorporated by reference in its entirety.

Figure 11:
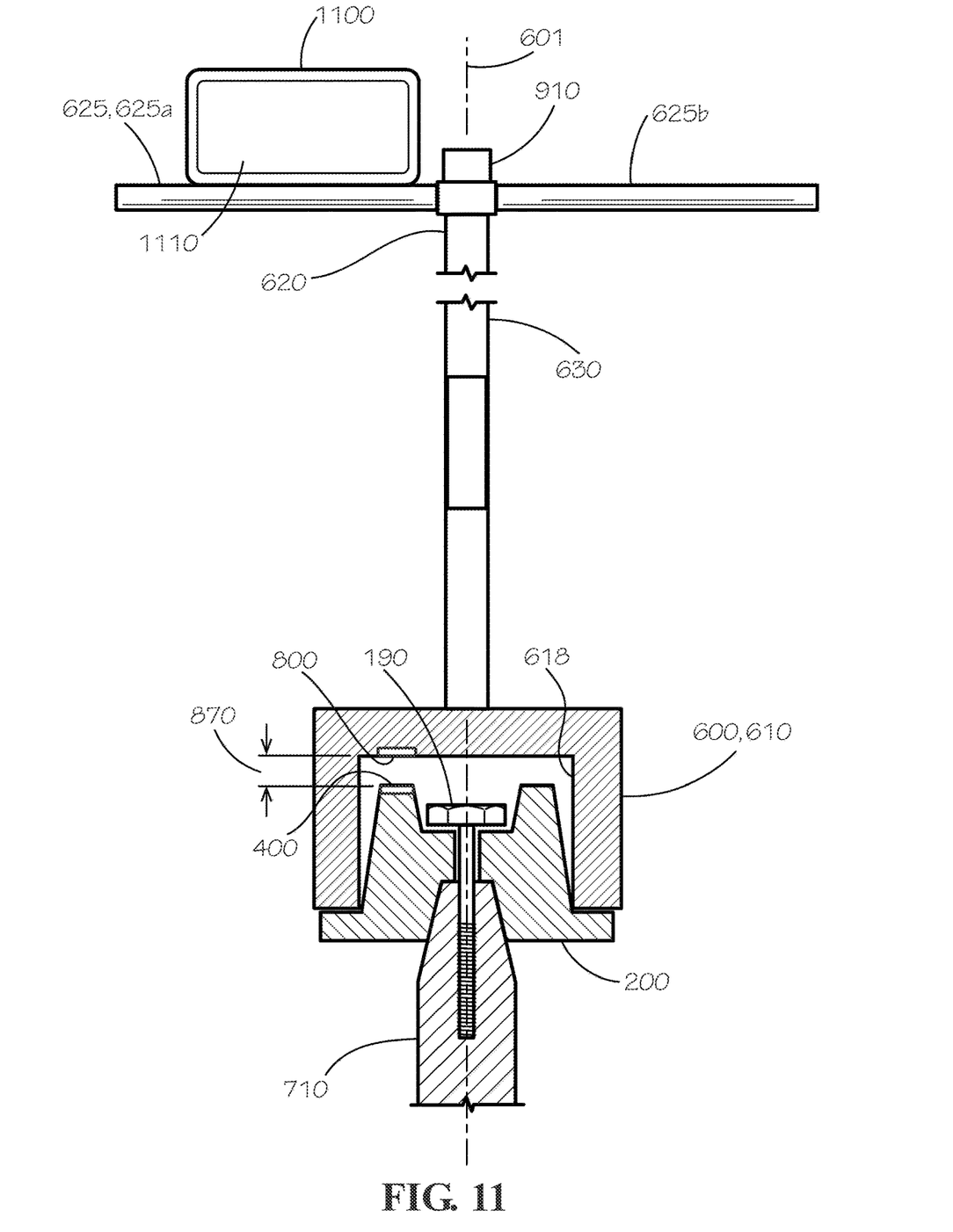
FIG. 11 is a partial sectional view of the operating nut of FIG. 1 and the torque wrench of FIG. 10 taken along line 11-11 of FIG. 10.

In some aspects, the tool 600 can comprise a device that can measure torque and can transmit the torque measurements and/or receive torque limits (minimum and/or maximum) to an electronic device 1100 (shown in FIG. 11). The device for measuring torque can be the aforementioned torque wrench or a digital torque adaptor such as Model 20741A available from Neiko, either of which can comprise the identification tag reader 800 (shown in FIG. 8) and can be network-enabled, e.g., using BLUETOOTH communications technology. In some aspects, for example, a regular ratchet with no ability to measure torque can be coupled with the digital torque adaptor, and the identification tag reader 800 can be secured to any portion of the tool 600 (including the ratchet, the digital torque adaptor or the socket) in sufficient proximity to the identification tag 400. Such a digital torque adaptor or a full torque wrench can communicate as desired with the identification tag 400 or the identification tag reader 800. In some aspects, the tool 600 or any portion of the tool such as, for example and without limitation, the torque wrench or torque wrench adaptor can be configured to emit an audible beep when a predetermined torque value is measured.

Figure 7:
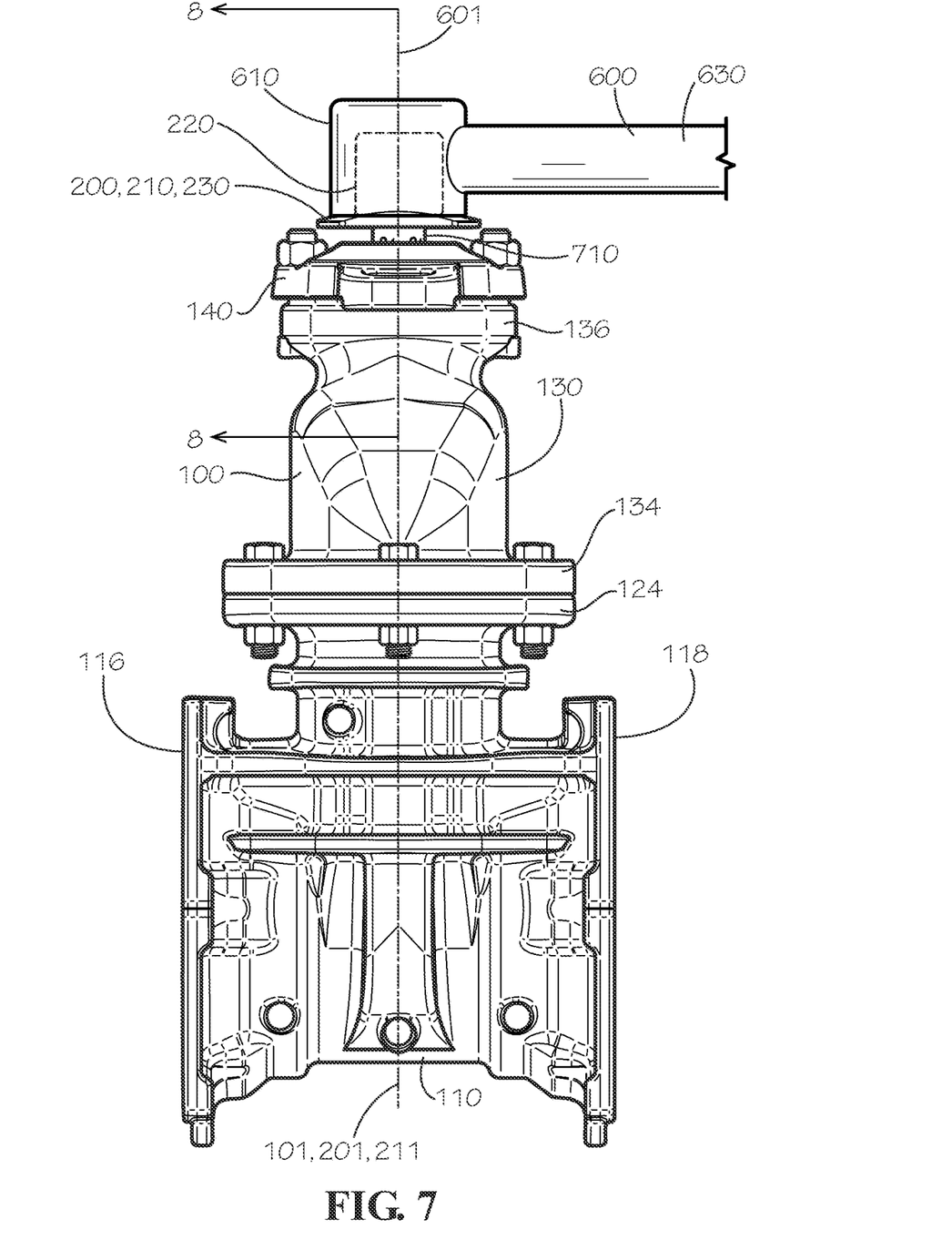
FIG. 7 is a first side elevation view of the assembly of FIG. 6.
Figure 8:
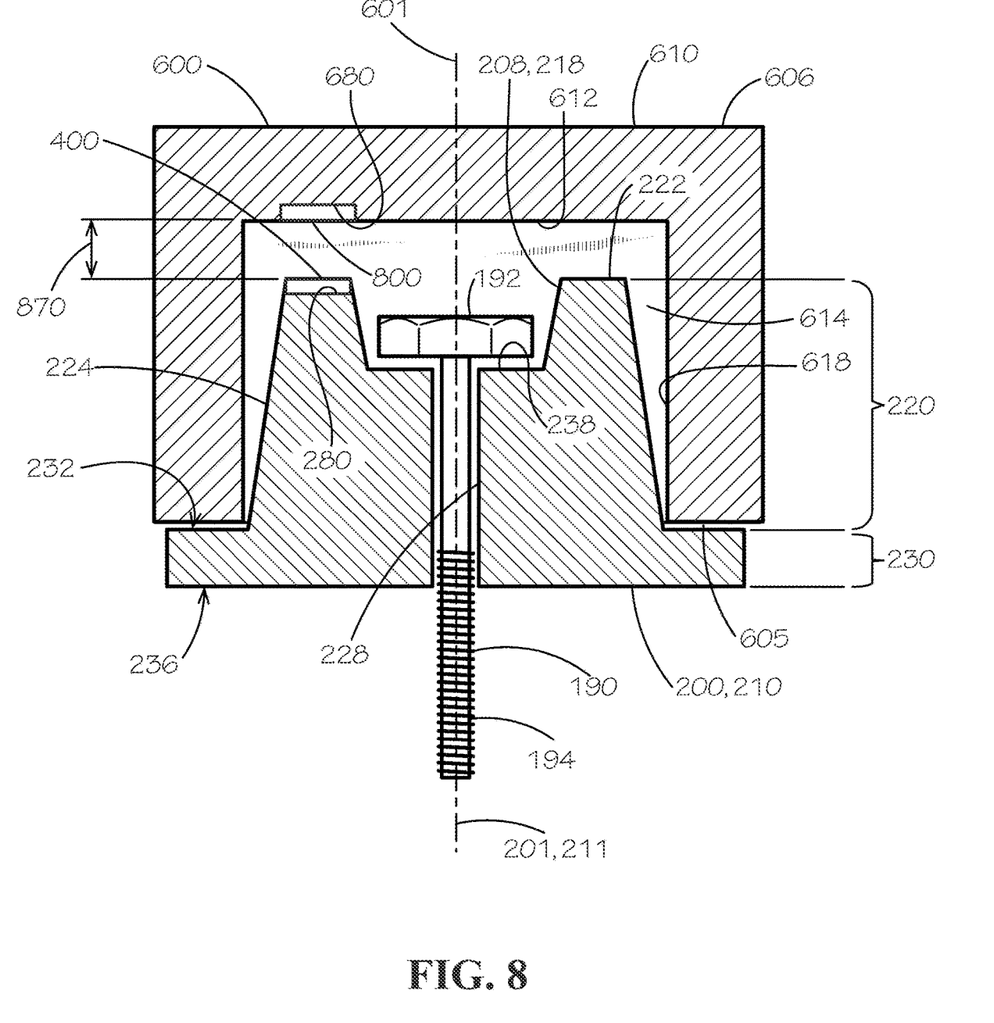
FIG. 8 is a sectional detail view of the operating nut and the torque wrench of FIG. 6 taken along line 8-8 of FIG. 7.

FIG. 7 is a first side elevation view of the assembly of FIG. 6 comprising the device 100 and the tool 600. In some aspects, as shown, one or more components of the device can be aligned along the axis 101 of the device 100, including when the device 100 is viewed from the side as shown. In some aspects, one or more components of the device 100 can be offset horizontally from the axis 101 of the device 100, including when the device 100 is viewed from the side as shown. As shown, the tool 600 can be configured to receive at least a portion of the operating nut 200 (e.g., the working portion 220 of the body 210) within the tool end 610, at which time the axes 201,211 of the operating nut 200 and the axis 601 of the tool 600 can be aligned. In some aspects, as shown, contact between the tool 600 and the flanged portion 230 of the operating nut 200 can control or set an axial position of the tool 600 with respect to the operating nut 200 along the axes 201,211,601. In some aspects, a socket and a wrench of the tool 600 can be separate, and the identification tag reader 800 (shown in FIG. 8) can be secured to either structure. In some aspects, an adaptor or kit can be added to the tool 600 and can incorporate a smart socket such as shown in FIG. 8. The smart socket can be received with the socket 618 (shown in FIG. 8) of the tool 600.

FIG. 8 is a sectional detail view of the operating nut 200 and the tool 600 of FIG. 6 taken along line 8-8 of FIG. 7. The tool end 610 of the tool 600 can define the tool socket 618, which can at least in part define the axis 601 and can further define a first end 605 and a second end 606. The socket 618 can define a plurality of side surfaces 614. The plurality of side surfaces 614 can define a shape in a cross-sectional plane orthogonal to the axis 601 matching the shape in a cross-sectional plane orthogonal to the axis 211 defined by the plurality of side surfaces 224 of the operating nut 200. Accordingly, in some aspects, the one or more side surfaces 614 can define a polygonal shape in a cross-sectional plane orthogonal to the axis 601. The polygonal shape can be, for example and without limitation, a hexagon, a pentagon, or a rectangle (e.g., a square) defining six, five, and four sides, respectively. In some aspects, the one or more side surfaces 614 can define a non-polygonal shape in a cross-sectional plane orthogonal to the axis 601. The non-polygonal shape can define one or more curvilinear sides, which can be continuous. More specifically, tangent lines of adjoining sides of the shape can be collinear. The socket 618 can define a tool opening with one or more open sides found on tools such as, for example and without limitation, an open wrench.

The tool 600 can comprise the identification tag reader 800, which can be secured to the tool 600. More specifically, the identification tag reader 800 can be permanently secured to the tool 600, i.e., it can be configured to not be removed from the tool 600 except by, in some aspects, a service technician. The identification tag reader 800 can be secured to one of the tool end 610 and the handle end 620 (shown in FIG. 6) of the tool 600 or anywhere in between the tool end 610 and the handle end 620. As shown, the identification tag reader 800 can be embedded in a cavity 680 defined in a surface of the tool 600 such as an end surface 612. In some aspects, the identification tag reader 800 can be an RFID tag reader. The identification tag reader 800 can be configured to "read" or access the identification tag 400.

Including when the operating nut 200 is received within the tool 600, the identification tag reader 800 can be offset or separated from the identification tag 400 by a separation distance 870. In some aspects, a particular separation distance 870 can be maintained by a user of the tool 600 through manual positioning of the tool 600 with respect to the operating nut 200, including positioning of the tool 600 with respect to the operating nut 200 along one or more of the axes 201,211,601. In some aspects, a user of the tool 600 can maintain the separation distance 870 by simply resting a portion of the tool 600 on the operating nut 200. More specifically, in some aspects, a user of the tool 600 can rest the first end 605 of the tool 600 on the first end surface 232 of the flanged portion 230 of the operating nut 200. In some aspects, a user of the tool 600 can rest another surface of the tool 600 such as, for example and without limitation, the end surface 612 on another portion of the operating nut 200 such as, for example and without limitation, the first end surface 222 of the operating nut 200.

The fastener 190 can comprise a head 192 and a shaft 194, which can comprise a threaded portion. The shaft 194 can secure the fastener 190 to the device 100, and the head 192 can retain the operating nut 200 to the fastener 190. The head 192 of the fastener 190 can be positioned within the central bore 208 and, more specifically, the first portion 218 of the operating nut 200. More specifically, as shown, the head 192 of the fastener 190 can be offset from the end surface 222. More specifically, as shown, the head 192 of the fastener 190 can be recessed within the central bore 208 and, more specifically, the first portion 218 of the operating nut 200. For clarity, a gap is shown between the head 192 of the fastener 190 and the operating nut 200 in a direction of one or both of the axes 201, 211. When the operating nut 200 is assembled to a remaining portion of the device 100, however, no such gap need exist.

In some aspects, the fastener 190 can be a tamper-proof or security fastener (not shown), which can be accessed or at least manipulated only by a member of the trade responsible for installing and maintaining the device 100 and not the general public. More specifically, a tamper-proof or security fastener can be any fastener not removable by any of a flat-head screwdriver or equivalent, a Phillips-head screwdriver or equivalent, a standard Allen-head screwdriver or equivalent (e.g., a plain male hex bit without accommodation for a pin), a standard hex-head socket or equivalent (e.g., a plain female hex socket defining a hexagonal shape or otherwise accommodating same, including both 6-point and 12-point hex sockets), a standard TORX screwdriver or equivalent (e.g., a standard TORX bit without accommodation for a pin), and a standard square-drive screwdriver or equivalent (e.g., a standard square-drive male bit). Fasteners that are tamper-resistant include, for example and without limitation, a pin-in-TORX fastener, a pin-in-hex fastener, a pin-in-Philips fastener, a spanner or drilled-spanner fastener, a one-way fastener, a tri-groove fastener, a TRI-WING fastener, a TP3 triangular recessed-drive fastener, and an OPSIT fastener. In some aspects, the fastener 190 can define special marking to further identify the operating nut 200 as the originally installed operating nut 200. In some aspects, the operating nut 200 can define or comprise the tamper-proof or security fastener. In some aspects, the operating nut 200 can be configured to receive the tamper-proof or security fastener.

Figure 9:
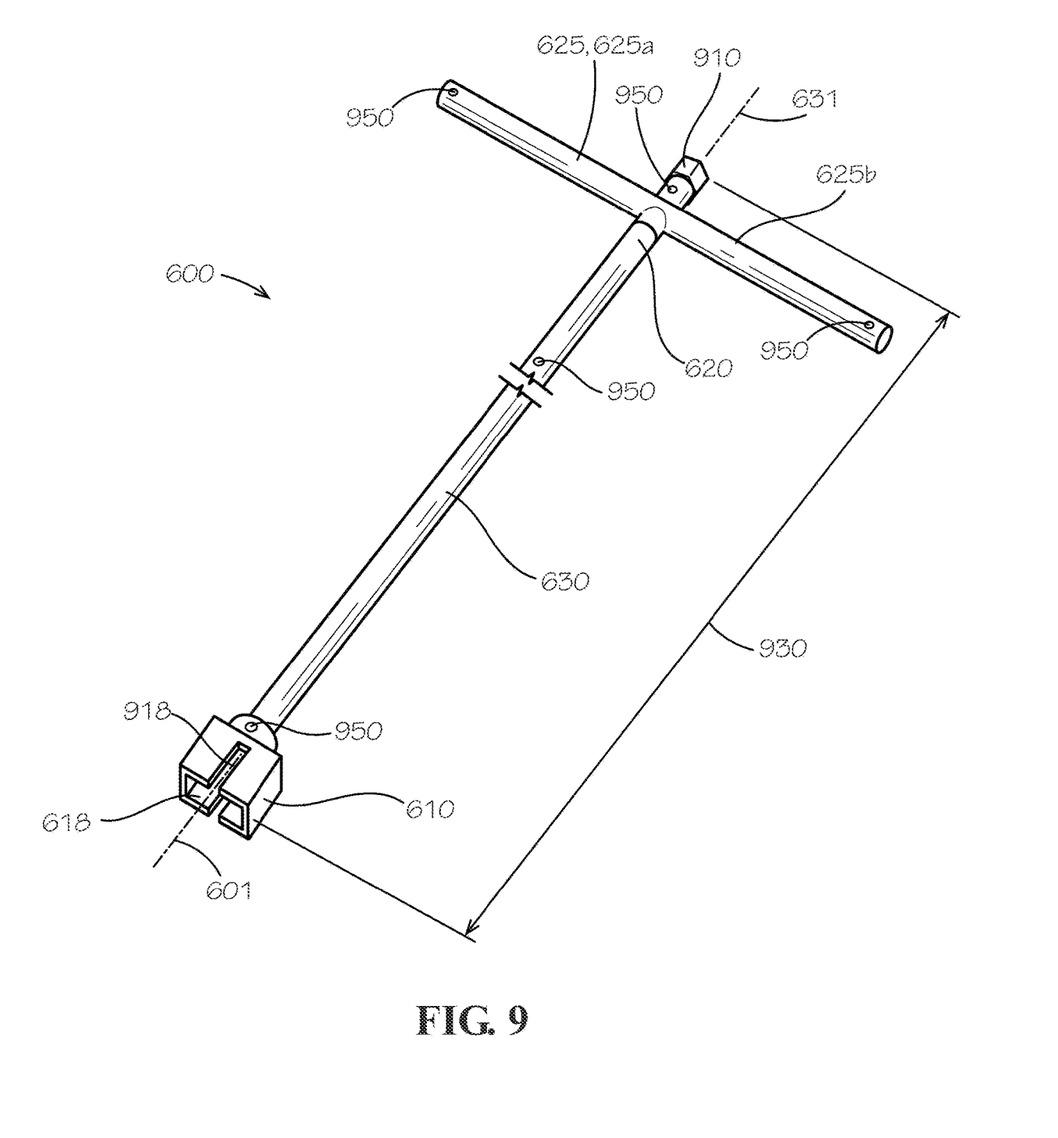
FIG. 9 is a bottom perspective view of a tool for the operating nut of FIG. 1, the tool being shown as a T-handle wrench in accordance with another aspect of the current disclosure.

FIG. 9 is a bottom perspective view of the tool 600, which can be a wrench as shown in accordance with another aspect of the current disclosure. More specifically, the tool 600 can be a T-handle wrench. The tool 600 can be configured to manipulate and also "read" the operating nut 200 (shown in FIG. 1). The handle 625 can comprise a first portion 625*a* and a second portion 625*b*, each of which can extend from a remaining portion of the handle end 620 of the tool 600. Each of the first portion 625*a* and the second portion 625*b* can extend in a radial direction with respect to the axis 601 of the tool 600, which can facilitate the application of torque to rotate the tool 600 and thereby open or close the device 100 by rotating the operating nut 200. Each of the first portion 625*a* and the second portion 625*b* can extend in opposite directions from each other.

In some aspects, as shown, the tool 600, which can be a first tool 600, can comprise a head 910. The head 910 can be configured to be driven by a separate, second tool 600 such as the tool 600 shown in FIG. 6 and, more specifically, the tool end 610 thereof. As such, the handle end 620 and, more specifically, the head 910 can define at least one of a handle socket and a handle engagement nut, which can be sized and otherwise configured to be received about or within the tool end 610 of the second tool 600. The head 910 and, more specifically, the one of the handle socket and the handle engagement nut can define the actuator axis 601. More specifically, the one of the handle socket and the handle engagement nut of the head 910 of the tool 600 can define a plurality of side surfaces defining a polygonal shape in a cross-sectional plane orthogonal to the actuator axis 601.

The tool end 610 can define one or more slots 918, which can be mud slots. The slots 918 can allow solids and/or liquids (e.g., mud) to escape from a cavity defined between the tool end 610 and the operating nut 200 during engagement of the tool 600 with the operating nut 200. In some aspects, one or both of the tool end 610 and the handle end 620 and, more specifically, the handle 625 and the handle portions 625*a*,*b* can be formed integrally or monolithically (i.e., formed as a singular component that constitutes a single material without joints or seams) with each other and the shaft 630. In some aspects, the shaft 630 can be formed separately but then fastened to each of the tool end 610 and the handle end 620. A fastener (not shown) joining the separate parts of the tool 600 can be removable such as, for example and without limitation, a bolt; or the fastener can be permanent such as, for example and without limitation, a weldment. A length 930 of the tool 600 along an axis 631 of the shaft 630 and optionally, as shown, in a direction of the actuator axis 601 can be as desired and can even be adjustable during use. In some aspects, the length 930 can measure any length up to 10 feet or more in regular (e.g., one foot) or irregular increments.

The tool 600 can comprise one or more sensors 950. The one or more sensors 950 can comprise any measuring device such as, for example and without limitation, a torque meter, a position or revolution counter, and a temperature sensor. In some aspects, the one or more sensors 950 can be positioned on the tool end 610 and, more specifically, in or adjacent to the tool socket 618. In some aspects, the one or more sensors 950 can be positioned on the shaft 630. In some aspects, the one or more sensors 950 can be positioned at any position on the handle 625. In some aspects, the one or more sensors 950 can be positioned on or adjacent to the tool head 910.

Figure 10:
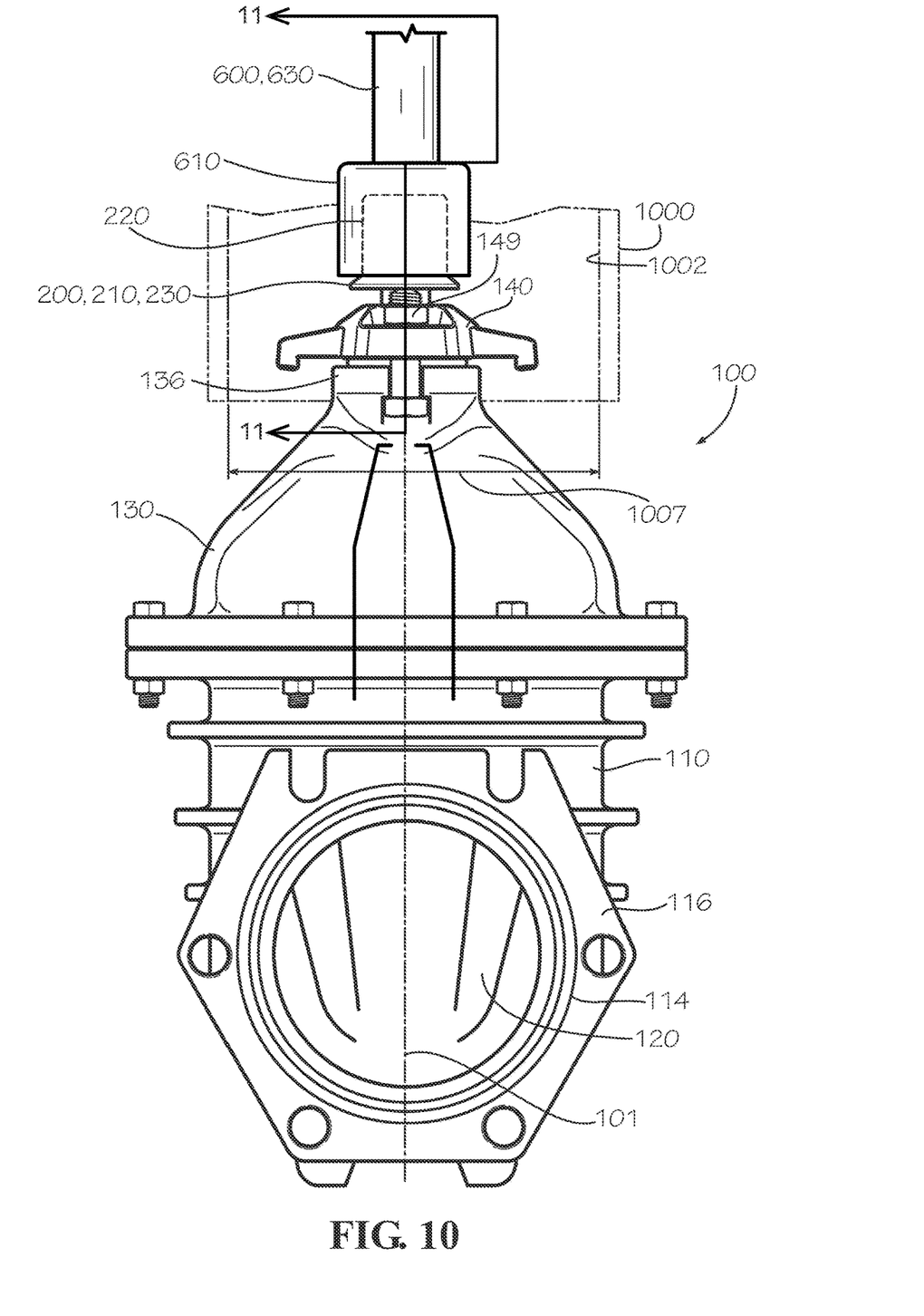
FIG. 10 is a second side elevation view of the assembly of FIG. 6 in accordance with another aspect of the current disclosure comprising the torque wrench of FIG. 9.

FIG. 10 is a second side elevation view of the device 100 shown in FIG. 6 with the tool 600 in accordance with another aspect of the current disclosure. In some aspects, as shown, a device box 1000 can extend from the device 100 and, more specifically, can extend towards the position of the user to facilitate access to the device 100. The device box 1000, which can be cylindrically shaped or have any other desired shape, can protect components of the device 100 or provide access to components of the device 100 in various applications, such as the operating nut 200 when the device 100 is underground. The device box 1000 can be a valve box. The device box 1000 can define an open bottom, which can be positioned over the underground component of the device 100. The top of the device box 1000 can be at or near ground level. In some aspects, a portion of the device 100 such as, for example and without limitation, the stuffing box 140 can interface with the device box 1000 to keep the device box 1000 centered above or about the operating nut 200 and can affix the device box 1000 to the device 100 or a portion thereof. The device box 1000 and, more specifically, an inner surface 1002 thereof or an inner diameter 1007 defined thereby can be sized and otherwise configured to receive the tool 600 and at least a portion of the device 100.

FIG. 11 is a sectional view of the operating nut 200 of FIG. 1 and the tool 600 of FIG. 10 taken along line 11-11 of FIG. 10. The tool 600 can be configured as a "smart" tool 600, which can be configured to interface with and "read" data embedded in the identification tag 400 of the device 100 (shown in FIG. 10) and, more specifically, the "smart" operating nut 200 as shown. When the identification tag reader 800 is placed in the socket of the tool 600, for example, the reader can be in close proximity to the identification tag 400 in the operating nut 200 as described previously. The identification tag reader 800 of the tool 600 can be configured to send data contained in the identification tag 400 to the electronic device 1100 positioned proximate to, touching, or even secured to the tool 600. The identification tag reader 800 can send the data via wires or wirelessly to the electronic device 1100.

The electronic device 1100, which can be a portable electronic device, can be any device able to receive the data from the identification tag reader 800. The electronic device 1100 can comprise a graphical user interface 1110. In some aspects, as shown, the portable electronic device 1100 can be a smart phone or electronic tablet able to be held in a hand of the user and loaded with appropriate software, or it can be some other connected device (i.e., a device configured to be connected to a network, e.g., the Internet or any electronic device connected thereto). In some aspects, the identification tag reader 800 can be configured to connect to the electronic device 1100 or to a second "smart" tool 600 (such as that shown in FIG. 6) engaged with the first tool 600 by BLUETOOTH (a federal certification mark of Bluetooth SIG, Inc.) technology or any other wireless communications technology.

The electronic device 1100 can receive data from and control the identification tag reader 800. In some aspects, the electronic device 1100 or a software application or "app" loaded therein can be configured to wirelessly activate the identification tag reader 800. The graphical user interface 1110 of the electronic device 1100 can display data read from the identification tag 400 via the identification tag reader 800. Data saved on the identification tag 400 can include, for example and without limitation, a serial number, a digital certificate of authenticity (COA) or security token, or a physical location (e.g., position using GPS) for the device 100. In some aspects, other data can be saved to the identification tag 400, including data that is generated from the one or more sensors 950 (shown in FIG. 9) incorporated into the tool 600. In some aspects, the identification tag 400 can include operation history or maintenance history for the device 100.

The data can be gathered and attached to the identification tag 400 of the operating nut 200. Upon receipt, the data can be passed to an asset and system management software package operating on the Internet. This can create a larger or richer data set, because data including not including the identity of the device 100 but the also information about operation of the device 100 such as, for example and without limitation, how many turns the operating nut 200 has been turned and in what direction, and whether the valve member 120 (shown in FIG. 1) is currently open or closed. For example, the tool 600 can determine from the data on the identification tag 400 if the device 100, e.g., a valve, is an open right or open left build. Combining this information with a measurement from a torque sensor as part of torque wrench or digital torque adaptor, the system can determine that an operator has fully rotated the device 100 as much as it can go based on, for example, a torque measurement reaching a maximum limit in either the opening or closing direction. By pairing the measurement data with data in the database about the specifications of the device 100, the new position can be confirmed and recorded.

As described above, the tool 600 can be configured as a "smart" tool able to interface with the "smart" operating nut 200. The method of manufacturing the device 100 can comprise securing the identification tag 400 to the operating nut 200. In some aspects, the method of manufacturing the device 100 can comprise securing the identification tag 400 to another portion of the device 100. The method can comprise applying a sticker (for example, with an epoxy resin) before painting of the device to cover and protect a surface of the identification tag 400 against chemicals and/or an environment around the device 100. The method can comprise retrofitting a device 100 that is already in the field with a "smart" operating nut 200 as disclosed herein.

A method of using the operating nut 200 (and the tool 600) can comprise engaging the tool 600 with the operating nut 200 of the device 100. In some aspects, engaging the tool 600 with the operating nut 200 can comprise engaging the tool 600 with the operating nut 200 of one of a hydrant, a gate valve, and a butterfly valve. Again, the operating nut 200 can comprise the identification tag 400, and the tool 600 can comprise the identification tag reader 800. More specifically, as described above, the identification tag 400 can be a radio-frequency identification (RFID) tag, and the identification tag reader 800 can be an RFID reader. The method can comprise activating the identification tag 400 of the operating nut 200 with the identification tag reader 800 of the tool 600.

The method of using the operating nut 200 can comprise placing the identification tag reader 800 within a read range of the identification tag 400. The method can comprise identifying the type of device 100. The method can comprise identifying a unique identification number or code, e.g., a serial number, for the device 100. The method can comprise rotating the tool 600 to rotate the operating nut 200, which can comprise opening or closing the device 100 and, more specifically, opening or closing the valve member 120 of thereof. In some aspects, the display 640 of the tool 600 can change color (from red to green, for example) or another visual signal (e.g., a light) or an audible signal (e.g., a beep) can notify the user that a predetermined value for a particular measured parameter (e.g., torque measured by a torque sensor) has been reached. The method can comprise accessing the device with the tool 600 comprising at least the identification tag reader 800 when the device 100 is buried below grade. The method can comprise accessing the device with the tool 600 comprising at least the identification tag reader 800 when the device 100 is at the bottom of the device box 1000. In some aspects, the device can be positioned 8 to 10 feet down at the bottom of the device box 1000 or other pit.

The method of using the operating nut 200 can comprise tracking the device 100 during its manufacture and/or operation. The method can comprise transmitting data about the device 100 through the tool 600 to a remote server. The method can comprise transmitting such data via wires or wirelessly to the electronic device 1100, which can be loaded with appropriate software. The method can comprise transmitting such data to asset and system management software located elsewhere on the Internet. The method can comprise displaying data about the device 100 on the device 1100 or on the tool 600 itself. More specifically, the method can comprise communicating such data to a user or operator of the tool 600 through an interface on the electronic device 1100 or on the display 640 of the tool 600. Such information can include, for example and without limitation, one or more parameters as mentioned elsewhere. Such one or more parameters can further include the model or size of the device 100, the current state of operation of the device 100 (whether the device 100 was last left in the open or closed state, for example), when the device 100 was last actuated, the expected number of turns required to open or close the device 100, whether the device 100 was open right or left, and the torque required to achieve a good seal upon closure of the device 100. For example and without limitation, the display can read "8" NGV MJxFL OR, "which can mean that the device 100 is an 8" Next Generation Gate Valve (thin walled, resilient wedge) with mechanical joint connections on both sides of the device 100 and a stem/disc nut combination that raises the valve member 120 when the device 100 is turned to the right (Open Right).

When measuring torque with the tool 600, the method can comprise alerting the user that the appropriate (and predetermined) amount of torque has been reached. More specifically, the method can comprise making an audible beep when such a predetermined torque setting, which can vary by the size of the device 100, has been reached. In some aspects, the predetermined torque setting can change automatically based on the particular device 100 being operated. In some aspects, the method can comprise transmitting to the tool 600, e.g., a torque wrench, a final (closing) torque limit via the device 1100, The method can comprise geotagging the data, which can include mapping the device 100 to a particular geolocation or physical location. The method can comprise supplying information to a service log for the device 100. The method can comprise the device 1100 setting the status for a newly installed device 100. For example and without limitation, the device 1100 can be used to start the record of open or closed status of the device 1100.

The method of using the operating nut 200 can comprise maintaining an operational and maintenance history of the device 100 on a server. The method can comprise accessing and/or transmitting to a support office or support staff manuals for the device such as, for example and without limitation, service guides, parts lists, drawings, and other manuals and information. The method can comprise automatically gathering operational data on multiple devices 100, which can even be from multiple customers and over time, through use of the tool 600 with the operating nut 200. Such gathering of data can comprise gathering data on internal manufacturing processes (e.g., manufacturing date, lot numbers of components used to assemble the valve, data recorded from test stands in assembly, and quality test reports), tracking of the devices 100 during manufacture and/or shipping (e.g., location and quantity of in-process devices 100 and total shift or daily production), installation of the devices 100, operation of the devices 100, and field breakdown rates of the devices 100. The method of using the operating nut 200 can comprise not powering the device 100 or the operating nut 200 thereof.

The method of using the operating nut 200 can comprise developing a map that plots the locations of multiple geo-tagged devices 100. The method can comprise displaying multiple geo-tagged devices 100 of a system on a "war room map" and showing various data (e.g., any of the aforementioned data) on each. The method can comprise alerting a service vehicle or service technician that one or more devices 100 are located nearby the device 100 that is the subject of a service call and are themselves due for an inspection and/or service.

One or more portions of the device 100 such as, for example and without limitation, the body 110, the valve member 120, the bonnet 130, and the operating nut 200 can be constructed from cast iron, ductile iron, or other similar materials. The same one or more portions of the device 100 can be formed using any one of a number of molding (e.g., casting), subtractive manufacturing (e.g., machining), or additive manufacturing (e.g., three-dimensional printing) methods.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of That which is claimed is:

1. An operating nut comprising:
   a body defining a central bore defining an axis and comprising:
   a working portion defining an end surface and a plurality of side surfaces defining a polygonal shape in a cross-sectional plane orthogonal to the axis; and
   a flange portion extending outward from the working portion in a radial direction with respect to an axis of the operating nut, the flange portion defining a first end surface and a second end surface, the central bore extending through each of the working portion and the flange portion; and
   a digital identification tag secured to the body, at least one of the body and the digital identification tag defining an outer surface of the operating nut.

2. The operating nut of claim 1, wherein the digital identification tag is a radio-frequency identification (RFID) tag.

3. The operating nut of claim 2, wherein a read range of the RFID tag is equal to or less than 10 inches.

4. The operating nut of claim 2, wherein the RFID tag defines at least a portion of the outer surface of the operating nut, the portion of the outer surface of the operating nut defined by the RFID tag being coincident with the end surface of the working portion of the body.

5. The operating nut of claim 4, wherein the RFID tag is embedded in a cavity defined in the outer surface.

6. The operating nut of claim 5, wherein the RFID tag does not protrude outwardly past the outer surface in any direction away from or along the axis.

7. A device comprising the operating nut of claim 1, wherein the device comprises a valve.

8. The device of claim 7, wherein the device is one of a hydrant, a gate valve, a plug valve, a ball valve, a stem valve, and a butterfly valve.

9. A tool for manipulating an operating nut of a valve, the tool comprising:
   a tool end defining a tool socket defining an axis, the tool socket defining a plurality of side surfaces and sized to receive the operating nut, the operating nut defining a substantially polygonal shape in a cross-sectional plane orthogonal to the axis;
   a handle end extending from the tool end; and
   a radio-frequency identification (RFID) reader secured to the tool.

10. The tool of claim 9, wherein the RFID reader is secured to one of the tool end and the handle end.

11. The tool of claim 10, wherein the handle end comprises a handle extending radially outward with respect to the axis, the handle being configured to apply torque.

12. The tool of claim 10, further comprising a shaft extending between the tool end and the handle end.

13. The tool of claim 10, wherein the handle end defines one of a handle socket and a handle engagement nut, the one of the handle socket and the handle engagement nut defining the axis, the one of the handle socket and the handle engagement nut defining a plurality of side surfaces defining a polygonal shape in a cross-sectional plane orthogonal to the axis.

14. The tool of claim 10, further comprising a sensor configured to measure a parameter of the tool.

15. A method of using an operating nut, the method comprising:
   engaging a tool with the operating nut of a device, the operating nut comprising a digital identification tag and the tool comprising a digital identification tag reader, the operating nut further comprising a body defining a central bore defining an axis, an end surface, and a plurality of side surfaces defining a polygonal shape in a cross-sectional plane orthogonal to the axis, the central bore extending through the body;
   rotating the tool to rotate the operating nut; and
   activating the digital identification tag of the operating nut with the digital identification tag reader of the tool.

16. The method of claim 15, wherein engaging the tool with the operating nut comprises engaging the tool with the operating nut of one of a hydrant, a gate valve, and a butterfly valve.

17. The method of claim 15, wherein the digital identification tag is a radio-frequency identification (RFID) tag.

18. The method of claim 15, further comprising identifying a unique identification number for the device.

19. The method of claim 18, further comprising transmitting a parameter of the device to a remote server.

20. The method of claim 18, further comprising, based on the unique identification number, communicating data on the device comprising the operating nut to a user of the tool through an interface on an electronic device and a display on the tool.

* * * * *